Jan. 5, 1971  C. J. KORANDA  3,552,799
SPARGER TYPE UNLOADING APPARATUS FOR RAILROAD CARS
Filed July 18, 1969  7 Sheets-Sheet 1

Inventor:
Clarence J. Koranda
By
Bair, Freeman & Molinare
Attys.

Jan. 5, 1971 C. J. KORANDA 3,552,799
SPARGER TYPE UNLOADING APPARATUS FOR RAILROAD CARS
Filed July 18, 1969 7 Sheets-Sheet 2

Inventor:
Clarence J. Koranda
By Bair, Freeman & Molinare
Attys.

Jan. 5, 1971   C. J. KORANDA   3,552,799
SPARGER TYPE UNLOADING APPARATUS FOR RAILROAD CARS
Filed July 18, 1969   7 Sheets-Sheet 6

Inventor:
Clarence J. Koranda
By Bair, Freeman & Molinare
Attys.

Jan. 5, 1971  C. J. KORANDA  3,552,799
SPARGER TYPE UNLOADING APPARATUS FOR RAILROAD CARS
Filed July 18, 1969  7 Sheets-Sheet 7

Inventor:
Clarence J. Koranda
By Bair, Freeman & Molinare
Attys.

United States Patent Office 3,552,799
Patented Jan. 5, 1971

3,552,799
SPARGER TYPE UNLOADING APPARATUS FOR RAILROAD CARS
Clarence J. Koranda, Western Springs, Ill., assignor to North American Car Corporation, a corporation of Delaware
Continuation-in-part of application Ser. No. 748,264, July 29, 1968. This application July 18, 1969, Ser. No. 842,895
Int. Cl. B65g 53/30
U.S. Cl. 302—14
17 Claims

ABSTRACT OF THE DISCLOSURE

Method and apparatus for unloading dry bulk commodity from the body of a railroad car by discharging liquid in the form of streams in upward and lateral directions, into direct contact with the commodity for creating a slurry of all of the commodity in the body for expeditious removal of the commodity from the body of the car.

RELATED APPLICATION

This application is a continuation-in-part of my copending application, Ser. No. 748,264, filed July 29, 1968, and now abandoned.

BACKGROUND AND SUMMARY OF THE INVENTION

This invention relates to railroad cars for handling dry bulk commodities, and more particularly, to a novel method and apparatus for use with sparger type railroad cars for efficiently and expeditiously removing all of the bulk commodity from the bodies of the cars.

For many years the usual practice of transporting and unloading dry bulk commodities (such as, for example only, barium carbonate, potassium chloride, potassium chlorate, sodium chlorate, sugar and other like granular materials) from railroad cars consists in shipping the commodity in box type railroad cars to the destination where the commodity is removed from the cars by suitable mechanical equipment. For such unloading, normally there is employed manned type equipment, such as a power unloader for transferring the commodity from the car to a hopper conveying system or transferring it directly to a saturator, either of which operations are costly and time consuming. Such prior practices result in substantial waste or loss of commodity in handling, and frequently result in contamination of a load by reason of the boxcar containing a quantity of some other material from a prior load. One of the more important drawbacks of such methods of transporting dry bulk commodities is that during transit the material frequently cakes and forms large solid bodies which must be broken up before the material may be conveniently handled. Such prior practices add substantial cost to the processors and users of such commodities.

In recent years, covered hopper sparger type railroad cars have been employed to a limited extent in the handling of dry bulk commodities, and which cars have definite advantages over conventional boxcars in that each of such sparger cars are capable of handling substantially greater tonnage of material. Thus, the use of sparger type cars resulted in reduction of demurrage charges and sometimes eliminated the necessity of movement of cars from a siding to a desired unloading position, which practice resulted in substantial cost savings.

Currently, to a limited extent, such dry bulk commodities are also being shipped in a slurry form, using tank cars. This usually results in the commodity settling out and forming a cake at the bottom of the tank which makes it very difficult, and sometimes impossible, to again put the commodity in suspension for slurry unloading. In the major uses of tank cars for this purpose, water is used as the slurry medium and when a tank car of slurry material is shipped, the freight rates become burdensome due to the fact that the load includes 50% or more of water.

While there has been some usage made of conventional sparger type railroad cars for handling of dry bulk commodities, in the main, such use has not been found totally acceptable or satisfactory. The main disadvantages are that such cars necessitate the use of substantial manual labor to effect the complete unloading of the commodity from the cars as well as adequate cleansing of the hopper portion of the cars after unloading to insure against contamination of a subsequent load of different material.

The method and apparatus disclosed in my Patent No. 3,316,023 dated Apr. 25, 1967 involving the use of a sparger type car represents a substantial and important improvement over earlier methods and apparatus for unloading dry bulk commodities, and the present invention represents important and further improvements over the method and apparatus disclosed in my said patent, as will be particularly pointed out.

One of the objects of this invention is to provide an improved method and apparatus for unloading dry bulk commodities from sparger type railroad cars which effects relatively great savings in cost in manufacture and assembly of the apparatus in the railroad cars.

Another object is to provide improved apparatus of the character indicated which greatly reduces the weight of the bottom hopper section of sparger type railroad cars and the piping heretofore used on such cars and by virtue of which the load-carrying capacity of the cars is greatly increased to the extent of the reduction in such weight of the car, and hence results in a substantial reduction in cost of the delivered commodity.

A further object is to provide a novel form and location of apparatus for creating and causing streams of liquid to be discharged adjacent the sump portion of the body of the car, in lateral and upward directions, throughout an angle of approximately 360 degrees, for rapidly and efficiently creating a slurry of the bulk commodity, and thereby effecting substantial saving in time in unloading the commodity from the car in the form of a slurry.

Other objects and advantages of this invention will be apparent from the following description, taken in connection with the accompanying drawings in which:

DESCRIPTION OF THE PREFERRED EMBODIMENTS

The railroad car embodying the present invention, and which is indicated in FIGS. 1–14 of the drawings generally at A, includes a body for containing dry bulk commodity and is of the sparger covered hopper type, and as shown includes three separate, connected hoppers B. Such cars and particularly the hoppers are usually formed of metal, and each of the hoppers are of, what is referred to in the industry, generally inverted pear shape design in vertical transverse section, as may be seen in FIG. 3 of the drawings. Each of the hoppers is provided with two normaly closed hatches, indicated at C, through which the bulk commodity is loaded into the hopper body. As may be seen in FIG. 3 of the drawings, the lateral walls 10 of each hopper body are in the main curved, with the upper portion being substantially semi-circular in contour and with the lower portions thereof, as indicated at 12, being curved in an inwardly and downwardly converging direction. The hopper's end walls each comprise a downwardly inclined portion 14 and an upright portion 16, the latter in some instances being a common wall with respect to two adjacent compartments or hoppers B. Since each hopper unit and the sparger arrangement or apparatus therefor are for all practical purposes identical, I will now for convenience describe a single hopper unit and its sparger arrangement.

Figure 1:
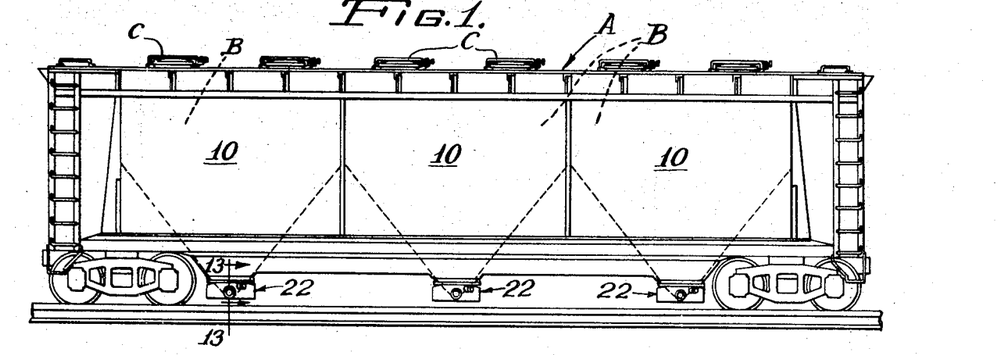
FIG. 1 is a side elevational view of a sparger type covered hopper railroad car embodying the present invention.
Figure 2:
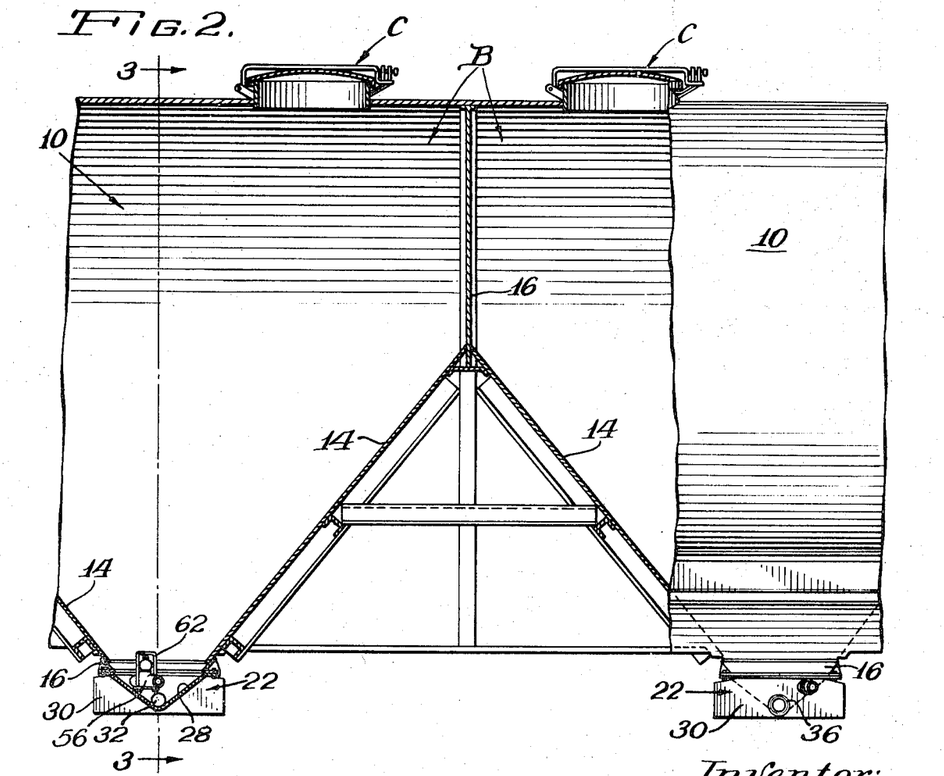
FIG. 2 is an enlarged, fragmentary, side elevational view of the railroad car with a portion being shown in section and a portion in elevation with respect to two adjacent hoppers of the car.
Figures 11, 12, 13:
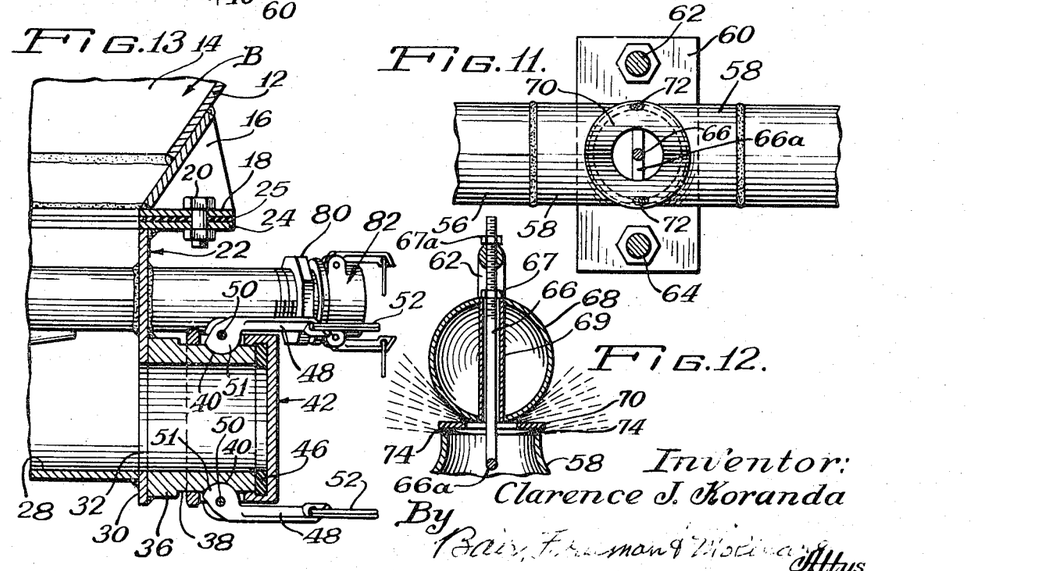
FIG. 11 is a top plan view of a portion of one of the sparger assemblies of the system, taken as indicated at line 11—11 on FIG. 10.
FIG. 12 is a sectional view through the valve means of one of the sparger assemblies with the valve means being shown in position to discharge liquid in lateral and upward directions.
FIG. 13 is an enlarged vertical section through the lower portion of the hopper body and the bottom hopper section through the sump portion and discharge outlet of the bottom hopper section, taken as indicated at line 13—13 on FIG. 1.

Surrounding the lower marginal edge portions of the curved side walls 12 and the inclined end walls 14 of the hopper body is a frame member 16 which is welded to said wall portions, as seen in FIG. 13. The frame member 16 includes a horizontally disposed flange 18 to which is secured by bolts 20 a bottom hopper section, indicated generally at 22, which hopper section includes a horizontal flange 24 at its upper end, registering with the flange 18 at the lower end of the main hopper body, with a gasket 25 interposed between said flanges, as seen in FIG. 13 of the drawings. The bottom hopper section includes a bottom 28, formed to provide two oppositely inclined portions, extending generally in the direction of the end walls 14, as seen in FIG. 2 of the drawings. The inclined portions of the bottom are connected by a curved section to form a sump or trough. Connected to the ends of the bottom 28 of the bottom hopper section, as by welding, are end walls 30 which complete the closure for the bottom hopper section, as may be clearly seen in FIGS. 5 to 7 of the drawings. The end plates 30 are each formed with a large circular discharge opening 32 adjacent the lower edges thereof, with the marginal edge of opening 32 registering with the curved formation, or sump portion, of the bottom 28, as seen in FIGS. 2 and 13 of the drawings.

Figures 5, 6, 7:
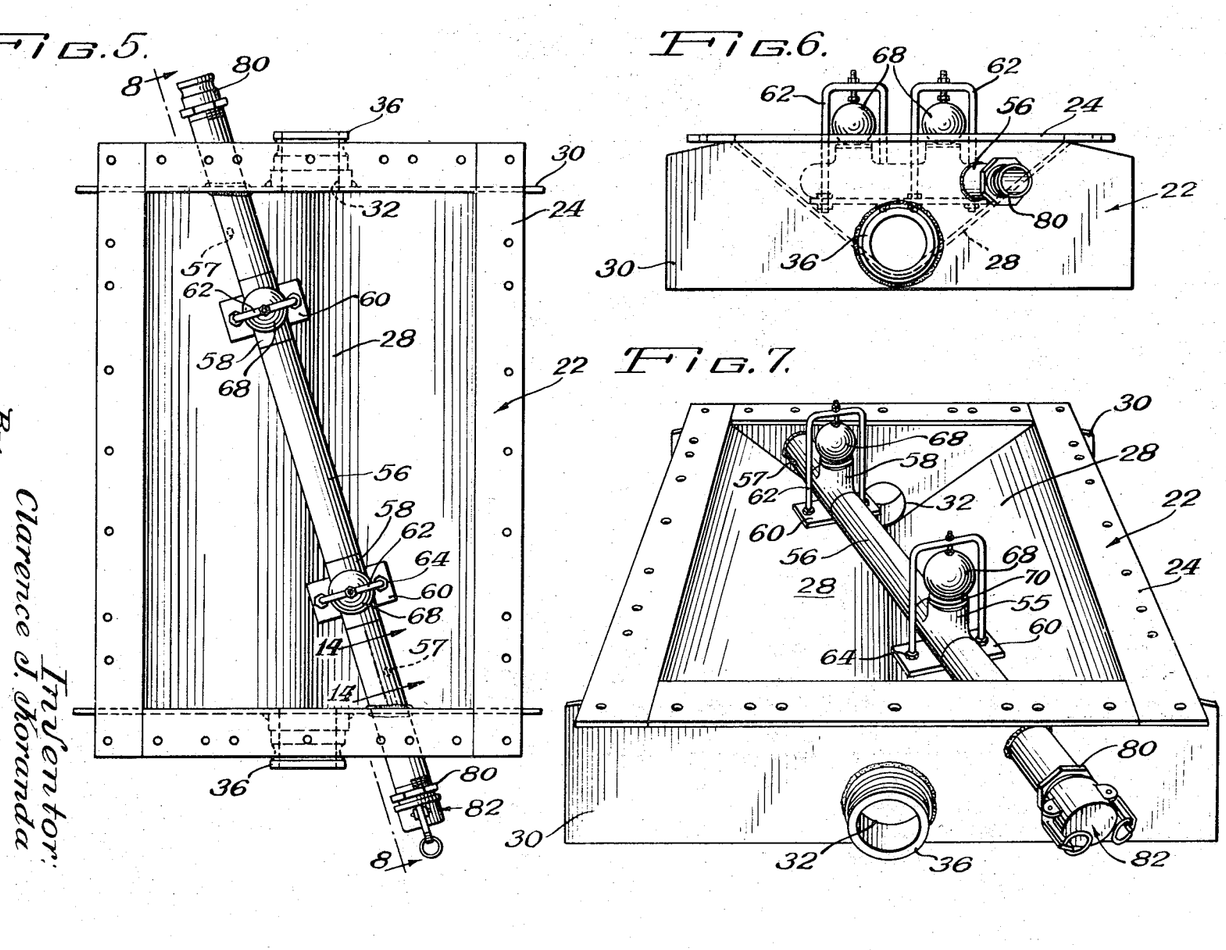
FIG. 5 is a plan view of the bottom hopper section with the novel sparger apparatus mounted thereon.
FIG. 6 is an end elevational view of the bottom hopper section.
FIG. 7 is a perspective view of the bottom hopper section.

Desirably, the openings 32 in the end plates 30 are of a diameter in the range of 4 inches to correspond in size to a conventional discharge conduit adapted to be associated therewith, as hereinafter be described. Welded to the exterior of each of the end plates 30, in registration with the openings 32, is a coupling adapter 36, as seen in FIGS. 5, 7 and 13 of the drawings. The external surface of each adapter is formed with a suitable annular groove 38 and a pair of recesses 40 for cooperative engagement with the locking elements of a conventional quick connect-disconnect type of closure element 42 for effectively providing a sealed closure for the end of the adapter 36, as seen in FIG. 13 of the drawings.

Figures 2A, 3, 4:
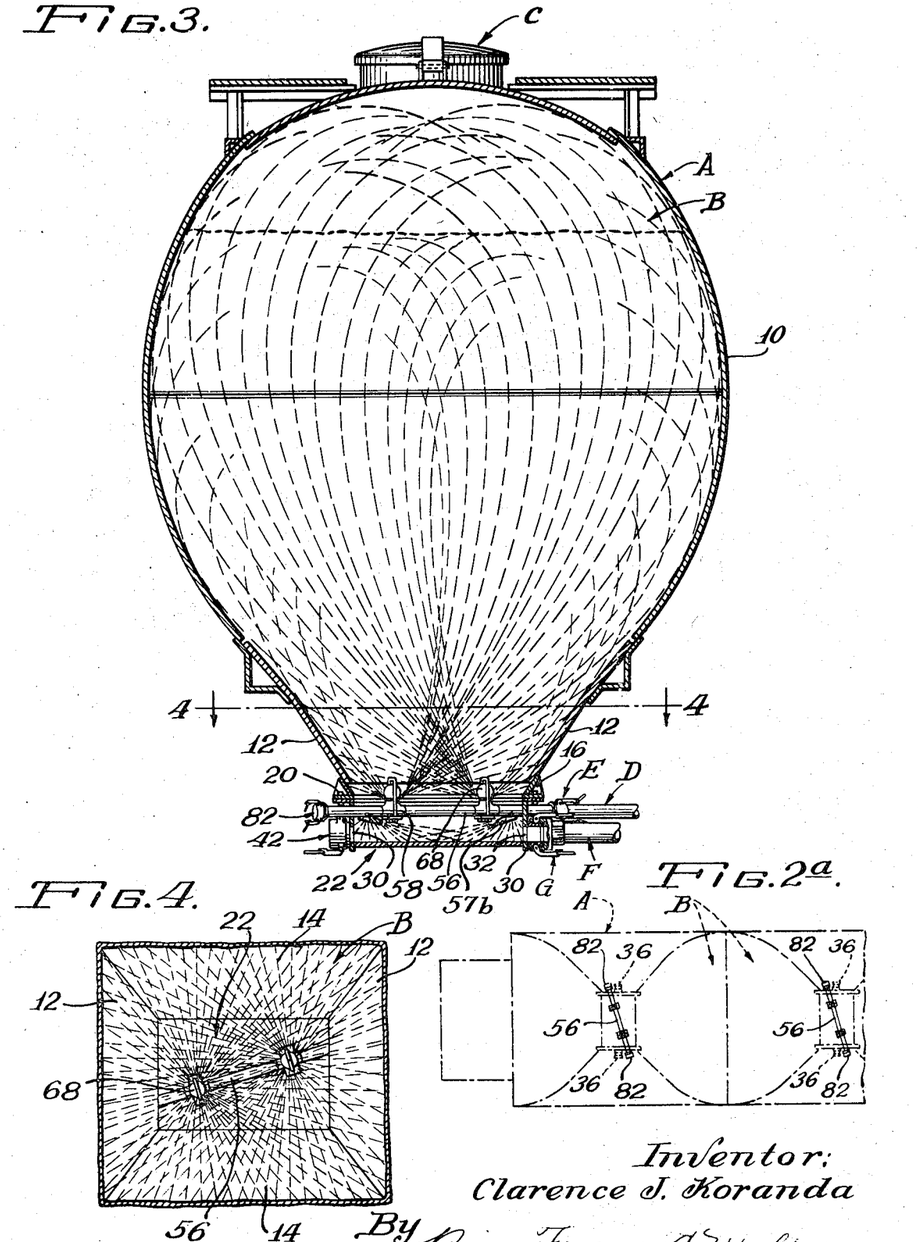
FIG. 2a is a plan view of one end portion of the car with the hopper arrangement being shown in dot and dash outline, and the sparger apparatus being shown in full lines.
FIG. 3 is a transverse vertical sectional view through a hopper, taken substantially as indicated at line 3—3 on FIG. 2.
FIG. 4 is a horizontal section view through the lower portion of one of the hoppers, taken substantially as indicated at line 4—4 on FIG. 3.

The closure element includes a cap or cup-shaped member for surrounding the end of the adapter 36, with a gasket 46 within the cap member for abutting against the end of the adapter, and a pair of operating arms 48 pivotally connected at 50 to the cap member. The operating arms are each provided with locking means 51, adapted to coact with the notches or recesses 40 formed in the outer wall of the adapter. When the hopper car is loaded and is in transit, the ring elements 52 at the outer ends of the operating arms 48 are usually interconnected by a suitable conventional wire seal, not shown. As may be observed from the drawings, the discharge openings 32, together with their adapters 36, and their respective closures 42 in position, are located at opposite sides of the car, as seen in FIGS. 3 and 13 of the drawings, for the purposes of permitting selective unloading of the commodity from the hopper at either side of the car.

Figure 8:
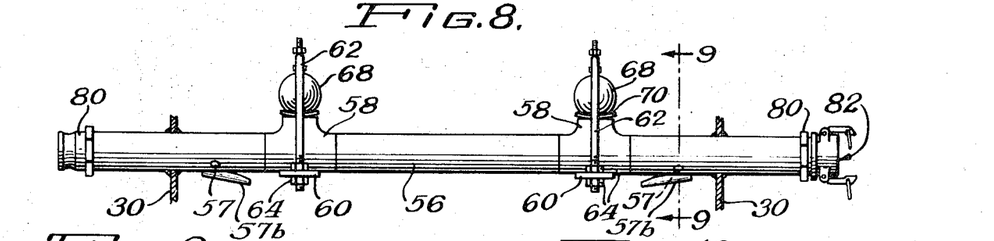
FIG. 8 is a transverse sectional view through the bottom hopper section, taken as indicated at line 8—8 on FIG. 5, showing the sparger apparatus in elevation.
Figures 9, 10:
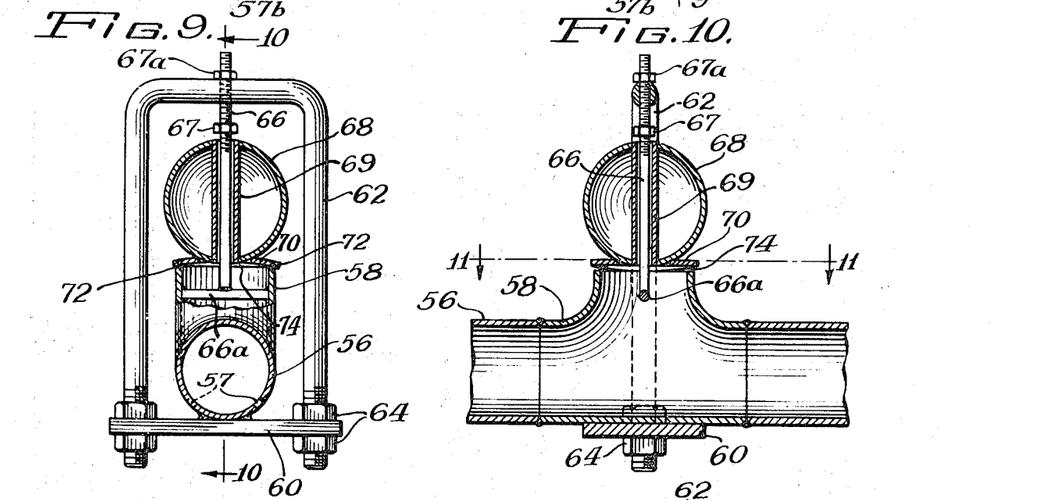
FIG. 9 is an enlarged transverse sectional view, taken as indicated at line 9—9 on FIG. 8, with one of the sparger assemblies being shown in section.
FIG. 10 is a longitudinal sectional view through one of the sparger assemblies, taken as indicated at line 10—10 on FIG. 9.

As may be noted from the drawings, each of the hoppers, or compartments, B are provided with their own individual sparging apparatus. The sparger apparatus for each hopper is mounted in and is totally supported by the bottom hopper section, as seen in FIGS. 5 to 7 of the drawings. The sparger apparatus in each of the bottom hopper sections includes a transversely extending conduit or pipe, 56, extending slightly diagonally for purposes hereinafter described. The pipe 56 is comprised of three sections, with the two outer sections extending through openings in the end walls 30 and welded thereto. Interposed between and connected to each of the adjacent sections is a T pipe fitting 58, the ends of which are welded to the adjacent ends of the central section of pipe 56, with the center leg of the T fittings extending in an upwardly direction, as seen in FIGS. 8, 9, 10 and 12. Welded to the underside of each of the fittings 58 is a saddle plate 60, to which is secured an inverted U-shaped frame 62, by means of nuts 64, threaded on the lower ends of the legs of the U-shaped frame. The spray means, or valving structure of the sparger apparatus, is connected to the closed or intermediate portion of the frame 62, by means of a threaded stem 66, the lower end of which is welded to a cross rod 66a, the opposite ends of which are welded to the inner surfaces of the fitting 58, as seen in FIGS. 9 and 10. Slidably mounted on the stem 66 is a ball shaped valve 68. The upper end of the stem 66 is threaded and extends through the middle portion of the U-shaped frame 62. A nut 67 on the stem 66 is adjustable thereon and serves as a stop to limit the upward movement of the ball valve at a desired position of adjustment. A nut 67a on the upper end of the stem firmly secures it to the frame 62.

Preferably, the ball-shaped valve is of hollow formation, the interior of which is provided with a sleeve 69 which serves to guide the ball in its vertical movement on the stem 66. Mounted on the upper end of the upright leg of the T fitting 58 is an apertured element 70, in the nature of a metal washer, which is welded to the fitting at two diametrically opposite points, as indicated at 72, with the portions of the washer, intermediate the weld points, being flared in an upward direction to provide a pair of slots 74 of substantially semicircular extent. Normally, the ball valve 68 seats in the opening of the washer element 70, as seen in FIG. 10 of the drawings.

The opposite ends of the conduit, or pipe, 56 projecting outwardly beyond the end walls of the bottom hopper section are each provided with a coupling adapter 80, which are normally closed by conventional quick connect-disconnect closure units 82, as seen in FIGS. 5, 7 and 13, which are substantially identical, except for size, to the closure units 42, which are normally applied to the outlet ends of the coupling adapters 36 of the sump portion of the hopper, as seen in FIG. 13.

It may be understood that the adapters and the piping for liquid supply for the sparger system may be of any suitable size, and preferably when utilizing a 4 inch diameter discharge opening 32 in the sump portion of the hopper, said piping and adapters for supplying liquid to the sparger system would desirably be in the range of 2 inch diameter. It is to be understood that when liquid is to be introduced to the sparger apparatus, the quick connect-disconnect closure 82, at the end of the conduit (at the side of the car where convenient to a source of liquid for the hopper is available) is removed and a suitable conduit provided with a quick connect-disconnect coupler of conventional design is then connected to tthe adapter 80, by virtue of which liquid under pressure is then supplied to both spray means or sparger assemblies in the bottom of the hopper.

It is of substantial importance that the two separate spray means, or sparger assemblies, in each hopper be spaced inwardly of the side walls of the bottom hopper section and that the two spray units, or sparger assemblies, be offset with respect to the geometric center of the bottom hopper section to insure the efficient creation of a slurry, and efficient cleansing of the interior of the hopper when the commodity is removed, as will hereinafter be described.

To unload the commodity from one of the hoppers, or compartments, of the car, the car is positioned with one side adjacent a liquid supply line and a slurry receiving conduit. It is to be understood that the liquid supply, depending on the nature and use of the commodity, may be water, brine or other suitable liquor. The quick connect-disconnect closure 82 is removed from the adjacent end of the sparger conduit 56, and the liquid supply line, indicated at D in FIG. 3, which is provided with a quick connect-disconnect coupler E at its end, is then connected to the coupler adapter 80 for supplying liquid under pressure to the two sets of spray means, or sparger assemblies, at opposite sides of the hopper. The quick connect-disconnect closure 42 associated with the coupler adapter 36 of discharge outlet of the sump of the hopper is removed, and a slurry discharge conduit F, provided at its end with a quick connect-disconnect coupler G is connected to the adapter 36 at the same side of the car. Either one or both of the hatches C of the hopper are then opened to insure venting of the hopper to atmosphere. The pump for the liquid supply line D is started, and liquid is discharged from the conduit, or pipe 56 through the upper end of each of the T fittings 58, exerting an upward force on the ball type valve 68 to move it upwardly, and the liquid is discharged through the central opening in the washer 70, against the curved bottom wall portion of the ball valve to form sprays projecting in a lateral and upward direction, throughout an approximate range of 360 degrees, as seen in FIGS. 3, 4, and 12, and simultaneously liquid is caused to discharge laterally in the form of sprays, through the slots 74, at each side of and below the washer 70, in a generally horizontal direction. The extent of upward movement of the ball valve is limited by the position of the nut 67 on the threaded portion of the stem 66. Adjustment of the nut on the stem varies the permissible range of upward movement of the ball valve to insure the creation of a desired spray pattern within the hopper. The side walls of outer end portions of the conduit, or pipe, 56, within the hopper, are each provided with a downward and lateral facing opening 57, arranged in opposite relation, so as to direct liquid, in the form of a spray, in a lateral and downward direction, toward the sump of the bottom hopper section.

Figures 14, 15, 16:
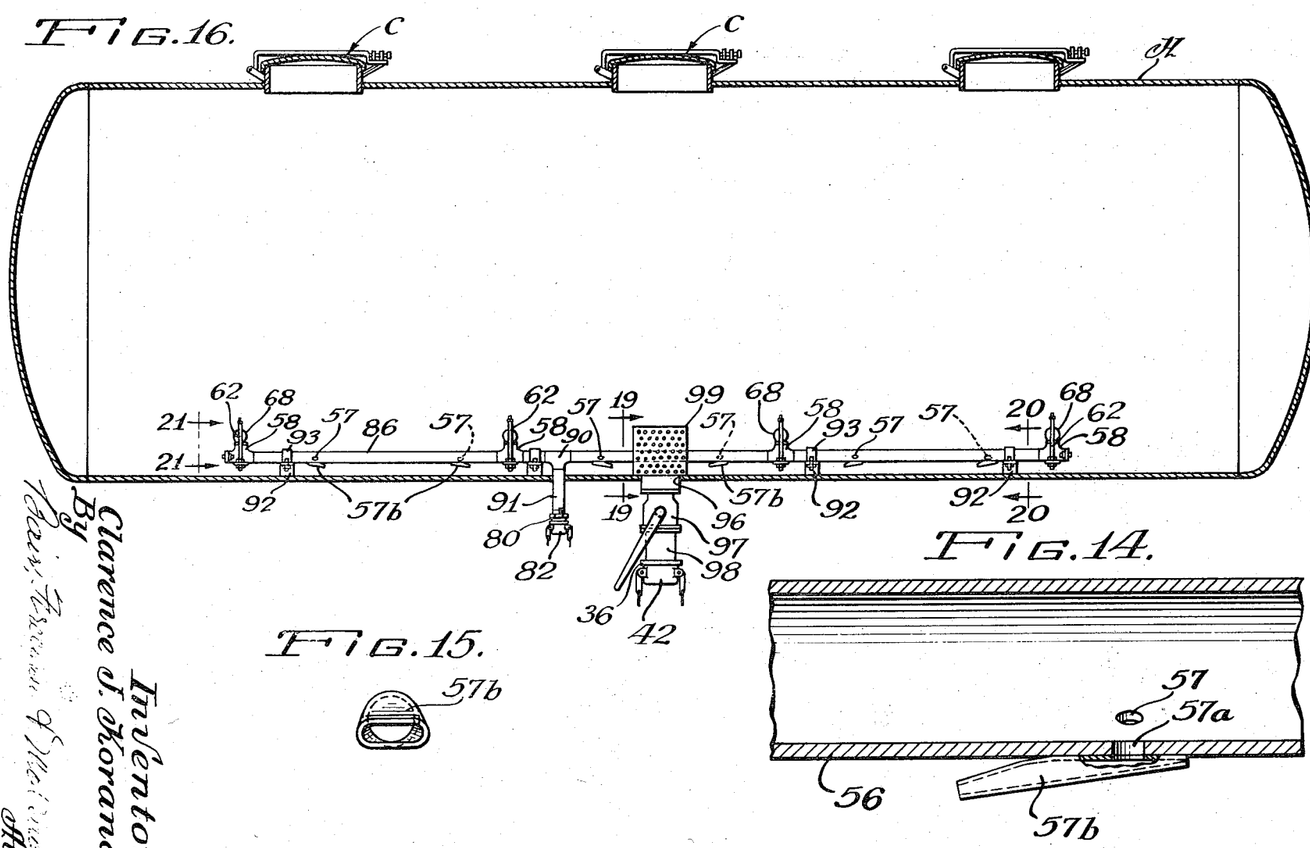
FIG. 14 is an enlarged section through the liquid supply conduit, taken as indicated at line 14—14 on FIG. 5.
FIG. 15 is an elevational view taken at the discharge end of nozzle shown in FIG. 14.
FIG. 16 is a longitudinal vertical section through a generally cylindrical tank of a tank type railroad car, embodying a modified form and arrangement of the sparger apparatus embodying the present invention.
Figure 17:
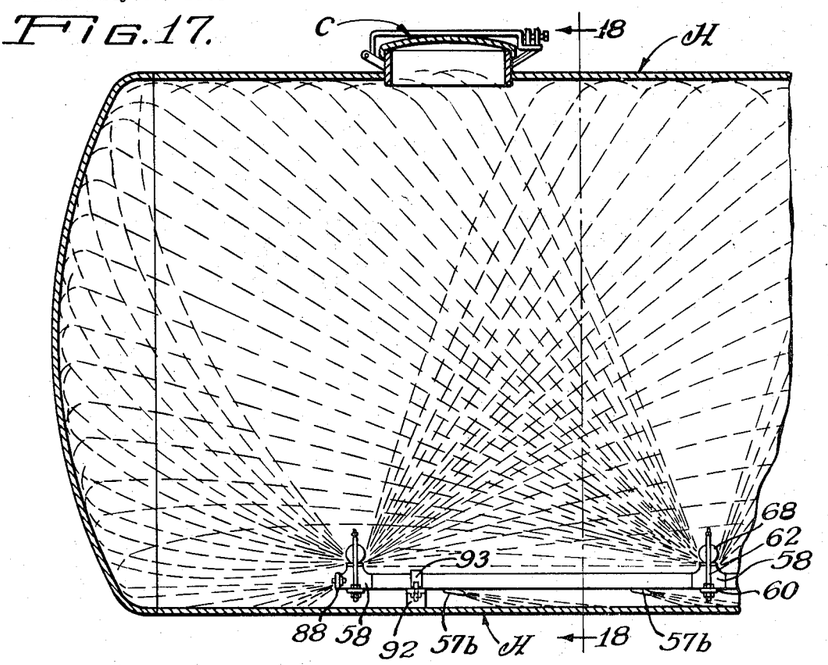
FIG. 17 is an enlarged vertical fragmentary end portion of the tank of a tank car showing generally the spray pattern of the sparger apparatus.
Figure 18:
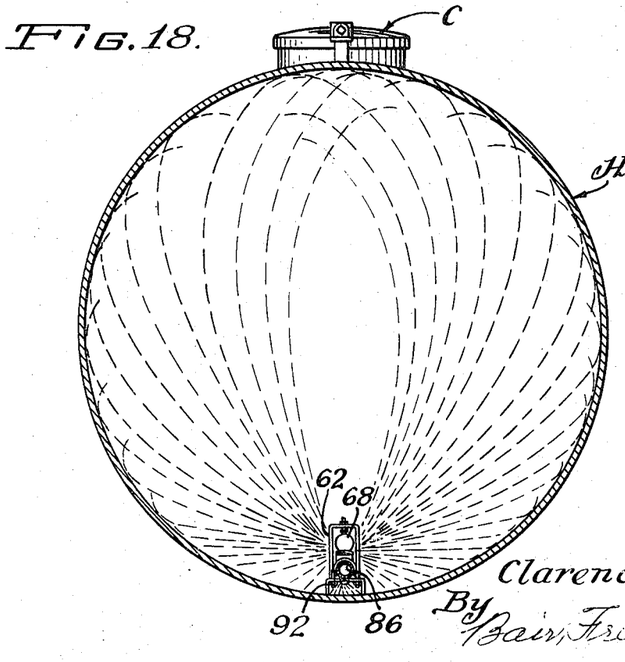
FIG. 18 is a sectional view through the tank, taken as indicated at line 18—18 on FIG. 17.

Each of said outer end portions of conduit 56 is also provided with a downward facing opening 57a, which registers with a nozzle 57b welded to the conduit. The nozzles having a flattened discharge end, as seen in FIGS. 8, 14, and 15, formed and positioned to direct sprays of liquid in a downward inclined direction toward the bottom of the sump of the hopper. As seen in FIG. 8, the nozzles are arranged in opposing relation.

Depending on the character of the commodity to be unloaded, the liquid introduced into the hopper serves to saturate the commodity to insure softening and conversion into a slurry. After the commodity is properly conditioned by the admixture with the liquid for a predetermined period of time, the pump for the sparger liquid supply conduit D is stopped and the pump for the slurry discharge conduit F is placed in operation for effecting a complete removal of the commodity, in slurry form, from the hopper. After the commodity is totally removed from the hopper, the interior thereof is thoroughly cleansed by again supplying the liquid to the spray assemblies for contacting the entire interior surfaces of the hopper to remove substantially all material or commodity therefrom. Upon the complete removal of all material, the pumps are disconnected and the couplers of the liquid supply and the slurry discharge conduits are removed, and the sump portion swabbed out, and the corresponding closures 82 and 42 are then replaced on the adapters and the hatches are then closed.

As may be seen from the drawings, the arrangement of the sparger assemblies, or spray means, and their novel form is such that liquid is projected in spray form in upward, lateral and downward directions. The liquid is introduced into the hopper under substantial pressure, preferably in the range of 40 p.s.i. or greater, and is caused to penetrate through the body of the commodity in the hopper to create an admixture of liquid and commodity and form a slurry. By reason of the sprays of liquid projecting in a downward direction through the openings 57, in the underside of the conduit 56, and nozzles 57b, the liquid is caused to be supplied in the general area of the sump portion of the bottom hopper section so as to insure rapid creation of a slurry in the zone where the slurry is to be discharged. As the slurry in the lower portion of the hopper is discharged, the body of the commodity within the hopper tends to cavitate, and finally the remaining portion of the load, which would normally tend to adhere to the side walls of the hopper, falls down into the zone of the streams of liquid, in slurry formation and is then discharged. As the liquid continues to be forcibly discharged into the body of the commodity, it creates a strenuously agitated, turbulent swirling admixture. When substantially all of the commodity is discharged from the hopper, the streams or jets of the liquid are permitted to impinge or flow over the surface of the hopper so as to effect substantial and complete removal of all commodity from the hopper, and thus insure against possible contamination of the next load of commodity placed in the hopper.

It will be noted that in the sparger apparatus disclosed in my Pat. No. 3,316,023, the sparger nozzles extend upwardly at an angle of approximately 45° and when the commodity, such as potassium chloride, is loaded into the hopper of the car the product may flow down the nozzle opening and possibly into the liquid supply conduit, which may cause partial or complete blockage of the liquid supply system. Such commodity is very hygroscopic and consequently the material may cake in the nozzle opening and sometimes in the liquid supply conduit. When this condition occurs, it requires a substantial amount of time to clear out the blockage, even when using liquid of approximately 180° F. and at 40 p.s.i. to dissolve the caked material before the nozzle will function sufficiently.

It will be observed that the novel type of spray means utilized is such that after the hopper is unloaded and the liquid supply line disconnected, the ball valve 68 of each sparger assembly returns by gravity to its seated position to seal the opening in the washer 70, and thus also functions as a check valve to preclude the commodity from entering the conduit 46, and eliminates possible blockage of the sparging apparatus. The diameter of the washer 70 is such that the marginal edge extends slightly outwardly beyond the exterior of the center leg of the T fitting 58, and serves as an umbrella to preclude commodity from entering the slots 74 beneath the washer and thus also insures against possible blockage of the sparger apparatus.

It will be observed that the novel spray means is such that it may be quickly and easily adjusted for varying the extent of movement of the ball valve off of its seat by moving nut 67 up or down on the stem 66. It will be apparent that the lower the limit of movement of the ball valve, the flatter will be the spray created by the ball. Another important advantage of the present invention resides in the fact that the sparger apparatus being totally contained in the bottom hopper section permits a railroad car to be quickly, easily and inexpensively reconverted to a standard hopper car by substituting for the bottom hopper section as herein disclosed a conventional, or standard, bottom hopper section to enable the car to be used for handling various other types of materials.

In the modified construction depicted in FIGS. 16–22, inclusive, I have shown the present invention as applied to a tank type railroad car wherein the running gear of the car is omitted. It is to be understood that the invention is applicable to a tank type railroad car wherein either a single tank or two or more tanks are mounted on the running gear of the car. The tank, as indicated in the drawings by reference numeral H, is of a generally cylindrical form in cross section, providing a body adapted to contain dry bulk commodity. The tank, depending upon its size, is provided with one or more hatches indicated at C, through which the dry bulk commodity may be loaded into the body or tank.

Figure 21:
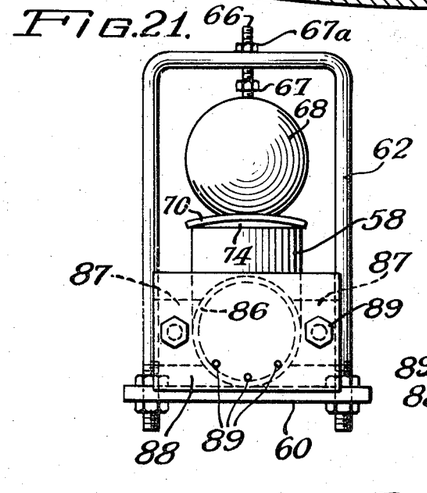
FIG. 21 is an enlarged end view of the sparger apparatus, taken as indicated at line 21—21 on FIG. 16.
Figure 22:
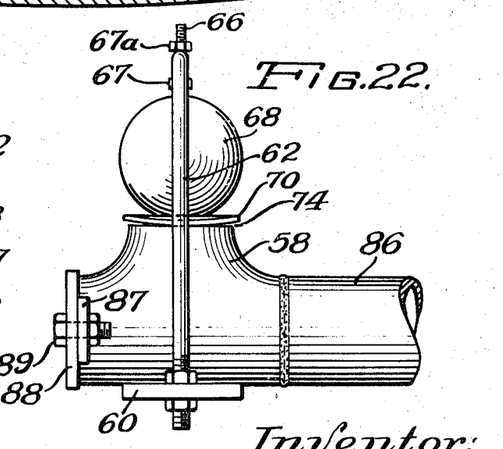
FIG. 22 is a side elevation of the end portion of the sparger apparatus seen in FIG. 21.

The sparging apparatus embodying the present invention is mounted adjacent the bottom of the interior of the body or tank and comprises a pipe or conduit 86 extending longitudinally of the tank. The conduit is comprised of a multiplicity of sections, herein shown as three, the adjacent ends of which are each welded to a T pipe fitting 58, and corresponding pipe fittings are welded to the outer ends of the outermost pipe sections as seen in FIGS. 16 and 22 of the drawings. Each of the pipe fittings is positioned with the center leg extending upwardly and associated therewith is a saddle plage 60 and an inverted U-shape frame 62 together with a valving structure identical to that disclosed in FIGS. 9–12, inclusive. Each of the T fittings, at the opposite ends of the conduit 86, at their outer ends, have a pair of lugs 87, welded to the side walls thereof, and a closure plate 88 is positioned to seal the outer end of said outermost fittings 58, and said plate is attached to the lugs 87 by bolts 89. The closure plate is provided with a plurality of apertures 89, as seen in FIG. 21 to provide auxiliary sprays as hereinafter referred to. The conduit 86 is also provided with a reversely positioned T fitting 90 in the intermediate section of the conduit, to which is connected a depending conduit 91 which extends downwardly through the bottom of the tank, as seen in FIG. 16. The lower end of the conduit 91 is provided with an adapter 80 to which is detachably connected a conventional quick connect-disconnect closure cap 82. Each of the sections of the conduit 86 is provided with a pair of longitudinally spaced apart apertures 57, on the lower side walls thereof, with the apertures in each pipe section being arranged on opposite sides. In alignment with each of said apertures 57 of the conduit sections is a downwardly facing opening 57a, in registration with which is a nozzle 57b, welded to the underside of the pipe, as seen in FIG. 14. As seen in FIG. 16, the sets of nozzles, at each side of the median center line of the tank, are arranged in opposed relation so as to direct jets or streams of spray of liquid in downwardly inclined directions toward the bottom or sump portion of the tank, and toward the median center line of the tank.

Figure 19:
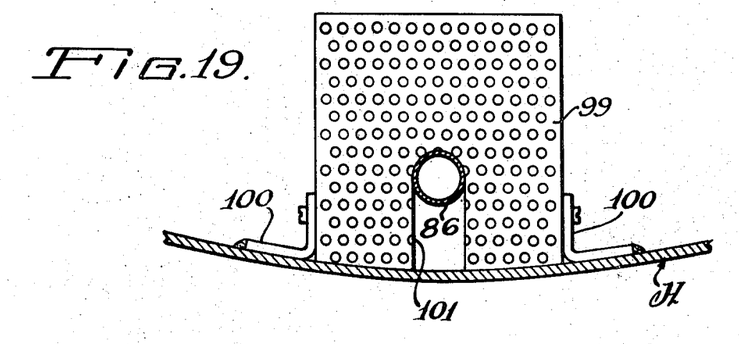
FIG. 19 is an enlarged fragmentary section taken at line 19—19 on FIG. 16.
Figure 20:
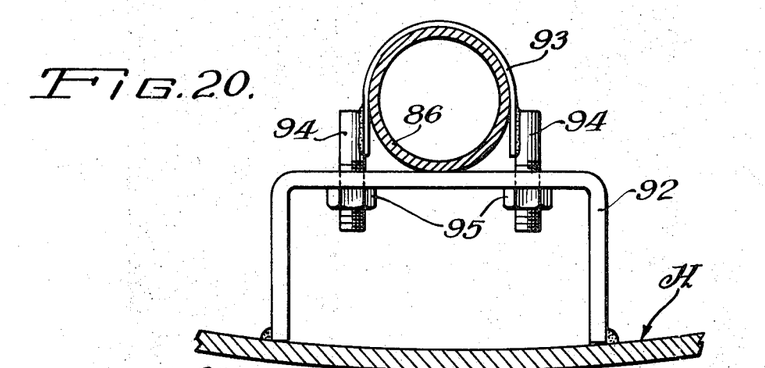
FIG. 20 is an enlarged section through the sparger apparatus, taken as indicated at line 20—20 on FIG. 16.

The conduit 86 together with the pipe fittings and spray apparatus associated therewith, is totally supported in close spaced relation to the bottom or sump portion of the tank as seen in FIGS. 16–20, inclusive, by a plurality of longitudinally spaced apart inverted U shaped brackets 92, with the lower ends of the legs of the brackets welded to the interior of the bottom of the tank, as seen in FIG. 20. The conduit 86 is fixedly secured to the brackets 92 by means of metal straps 93, trained over the top of the conduit 86, with their lower ends welded to threaded studs 94, extending down through the top portion of the brackets 92, and the studs being secured in place by nuts 95, as seen in FIG. 20 of the drawings.

As seen in FIG. 16 of the drawing, the bottom of the tank is provided with a relatively large opening 96, in which is welded a combined fitting and manually operable valve unit 97. The lower end of the valve unit is connected to a discharge conduit 98 extending in a downward direction. The lower end of the conduit 98 is provided with an adapter 36 which is normally closed by a conventional quick connect-disconnect closure 42. Mounted over and in surrounding relation to the opening of the fitting and valve unit 97 is an inverted cup shaped screen or strainer member 99 formed of perforated metal and which is snugly fitted between a pair of angle clips 100, welded to the bottom of the tank, as seen in FIG. 19. The cup shaped member 99 is provided with a pair of opposite slots 101 to permit accommodation of the conduit 86 when the member 99 is placed in operative position, with respect to the discharge opening for the tank. The purpose of the perforated member 99 is to prevent clogging of the discharge opening of the tank, such as might occur by lumps of the commodity moving into and over the discharge opening.

As may be observed in FIGS. 16–20 of the drawings, the sparger arrangement includes spray means of the same general construction as described in the embodiment shown in FIGS. 1–14, inclusive, and produces liquid spray patterns of the same general order to cause the commodity to be treated to produce a slurry. Because sprays of liquid are also directed downwardly through the openings 57 and the nozzles 57b as well as the opening 89 in the plates 88, at the opposite ends of the conduit apparatus, liquid tends to accumulate in the general area of the bottom or sump portion of the tank, causing a rapid creation of slurry of the material. Due to the direction of the sprays produced by the nozzles 57b, the slurry is caused to flow toward the median center line of the tank toward the discharge opening 96.

To prepare the tank H for discharge of the load of commodity therein, the quick connect-disconnect coupler 82 is first removed and the liquid supply line conduit indicated at D, having a quick connect-disconnect coupler E at its end, is then connected to the coupler adapter 80 for supplying liquid under pressure to the entire sparger system. The quick connect-disconnect closure 42, associated with the coupler adapter 36 of the discharge conduit 97 is then removed and a slurry conduit F, provided at its end with a quick connect-disconnect coupler G, is connected to the adapter 36. One or more of the hatches C of the tank are then opened for venting to atmosphere and the pump for the liquid supply line D is started and liquid is discharged through the conduit 86 and the sparger means or apparatus, in a manner for projecting streams of liquid into the interior of the tank in the manner above described with respect to the hopper car construction with the liquid being projected in the form of sprays in a lateral and upward direction throughout an approximate range of 360° and simultaneously projecting streams of liquid in the form of sprays in lateral directions through the slots 74 at each side of and below the washers 70 of each sparger assembly, in a generally horizontal direction. The ball valve is limited in its upward movement by the location of the nut 67 on the stem 66 and by adjusting the nut upward or downward, the range of upward movement of the ball may be maintained so as to produce a desired form and extent of spray within the tank. Also, simultaneously with the production of the sprays above described, additional sprays are produced as above referred to through opening 57, nozzles 57b, as well as sprays of liquid produced through the openings 89 in the end plates 88, at opposite ends of the conduit 86.

When the commodity to be unloaded has been adequately saturated with liquid, it will effect a softening and conversion of the commodity into a slurry for rapid discharge from the tank. After the commodity is properly conditioned by admixture with the liquid for a predetermined period of time, the pump for the sparger liquid supply conduit D is stopped, the valve 97 is opened and pump for the slurry conduit F is placed into operation for effecting a prompt and complete removal of all of the commodity, in the form of a slurry, from the tank body. After removal of substantially all commodity from the tank body, the interior thereof is thoroughly cleansed by again supplying liquid to the sparger system so that liquid contacts the entire inner surface of the tank body and effects a substantially complete removal of all commodity therefrom. After complete removal of all commodity from the tank body, the pumps are disconnected and the couplers of the liquid supply and slurry discharge conduits are removed and the valve 97 is closed and corresponding closures 82 and 42 are then replaced on the adapters 36 and 80 of the respective discharge and supply conduits and the hatches are again closed.

While the bottom wall of the tank or body is shown to extend in substantially a horizontal plane, if desired, the bottom wall may be so formed as to incline from opposite ends toward the discharge opening 96 for insuring a more rapid and complete flow of the slurry and liquid to the discharge opening.

I claim:

1. The method of unloading dry bulk commodity from a sparger type railroad car having a body provided with side walls which are arcuate in transverse vertical section and having a bottom portion provided with a sump associated with a discharge outlet, comprising the step of introducing from zones located within the lower portion of the body immediately above the sump, streams of liquid in upward and lateral directions, through an angle of approximately 360 degrees, into direct contact with the commodity in the body, for creating an agitated, turbulent admixture of liquid and commodity to form a slurry, and the step of withdrawing the slurry from the bottom of the body through the discharge outlet.

2. The method defined in claim 1, together with the step of introducing auxiliary streams of liquid within the body, simultaneously with and below the first mentioned streams, in a generally horizontal direction into direct contact with the commodity.

3. The method defined in claim 2, together with the step of introducing additional streams of liquid, simultaneously with and below the auxiliary streams, in downwardly inclined direction into direct contact with the commodity.

4. In combination with a railroad car having a body for receiving dry bulk commodity, said body having downwardly and inwardly converging side wall portions, sump means in the bottom of the body, outlet means associated with said sump means, one or more liquid spray means in the lower portion of the body, in close relation to the sump means, for discharging streams of liquid in upward and lateral directions into the body, each of said spray means being constructed and arranged to discharge streams of liquid through an angle of approximately 360 degrees, and a conduit connected to the spray means and extending externally through the wall of the body for connection to a source of liquid under pressure.

5. In a railroad car as defined in claim 4, wherein the spray means is constructed and arranged to discharge separate auxiliary streams of liquid, simultaneously with and below the first mentioned streams, in a generally horizontal direction, through an angle of more than 240 degrees.

6. In a railroad car as defined in claim 4, wherein said spray means comprises a T-pipe fitting operably connected to the conduit and having an upwardly facing opening, a valve member cooperatively associated with said opening and means for confining the valve member for movement toward and away from said opening, whereby liquid under pressure in the conduit raises the valve member and the valve member serves to deflect the liquid in the form of streams extending in upward and lateral directions.

7. In the railroad car construction defined in claim 6, wherein said spray means also includes an apertured member mounted on the upper end of the fitting, to provide a seat for the valve member, said apertured member being formed so as to create auxiliary streams of liquid extending in a generally horizontal direction below the first mentioned streams.

8. In the construction defined in claim 7, wherein the valve member is formed with an upwardly curved under surface, and said valve member seating in closed relation upon the apertured member when the supply of liquid is cut off.

9. In a railroad car construction as defined in claim 4, wherein said spray means comprises a T pipe fitting operably connected to the conduit and having an upwardly facing opening, a ball member mounted for movement toward and away from said opening, a stem carried by the fitting and extending into said ball for guiding it in its movement toward and away from said opening, whereby liquid under pressure in the conduit raises the ball member and impinges against the underside thereof to deflect the liquid in the form of streams in upward and lateral directions.

10. In a railroad car construction as defined in claim 9, together with adjustable means on the stem for limiting upward movement of the ball member.

11. In a railroad car construction as defined in claim 9, wherein said spray means also includes a washer element connected to and registering with the open upper end of said fitting to provide a seat for the ball member, said washer having portions bent upwardly, away from the fitting, providing a plurality of slots through which liquid is also discharged in the form of streams in a generally horizontal direction.

12. In a railroad car construction as defined in claim 4, in which the portion of the conduit, located within the body, is provided with downwardly directed openings for discharging streams of liquid toward the sump means.

13. In a railroad car construction as defined in claim 4, in which a portion of the conduit, located within the body, extends in a generally horizontal direction, and a plurality of nozzles operably connected to said conduit portion for discharging streams of liquid in a downwardly inclined direction toward the sump means.

14. In combination with a railroad car having a hopper for receiving dry bulk commodity, said hopper including a body provided with a bottom hopper section, connected to the lower end of the body, said hopper body having downwardly and inwardly converging wall portions, sump means in the bottom hopper section, outlet means associated with said sump means, liquid spray means carried by the bottom hopper section for discharging streams of liquid in upward and lateral directions into the hopper body, through an angle of approximately 360 degrees, and a conduit connected to the spray means and extending laterally through the side wall of the bottom hopper section for connection to a source of liquid under pressure.

15. In a railroad car as defined in claim 14, wherein said spray means comprises a pair of spray devices, spaced apart transversely of the hopper in offset relation to the geometric center of the hopper and interconnected with said conduit.

16. In combination with a railroad car having an elongated tank body of generally cylindrical cross-section, with the bottom serving as sump means for accumulating a slurry of liquid and commodity, liquid spray means in the body comprising a main longitudinally extending conduit positioned in close spaced relation to the bottom of the body, and a branch conduit extending through the bottom wall of the body for connection to a source of liquid under pressure, a plurality of longitudinally spaced spray devices interconnected to the main conduit for discharging streams of liquid in upward and lateral directions in the body through an angle of approximately 360 degrees; into contact with the commodity in the body, and a discharge conduit having one end in open communication with the sump means of the body.

17. In a car construction defined in claim 16, together with a plurality of longitudinally spaced nozzles operably connected to the main conduit for discharging streams of liquid in the direction of the sump means of the body.

References Cited
UNITED STATES PATENTS

| | | | |
|---|---|---|---|
| 3,055,378 | 9/1962 | Alford | 302—14 |
| 3,171,427 | 3/1965 | McAlpine | 302—15 |
| 3,316,023 | 4/1967 | Koranda | 302—16 |
| 3,375,043 | 3/1968 | Fritz | 302—52 |
| 3,451,724 | 6/1969 | Cappelli et al. | 302—14 |

ANDRES H. NIELSEN, Primary Examiner

U.S. Cl. X.R.

302—16, 52